J. FILION.
CAR VESTIBULE TRAP.
APPLICATION FILED OCT. 3, 1910.

993,445.

Patented May 30, 1911.

2 SHEETS—SHEET 1.

Witnesses
H. Davis.
H. E. Plant Jr.

Inventor
J. Filion

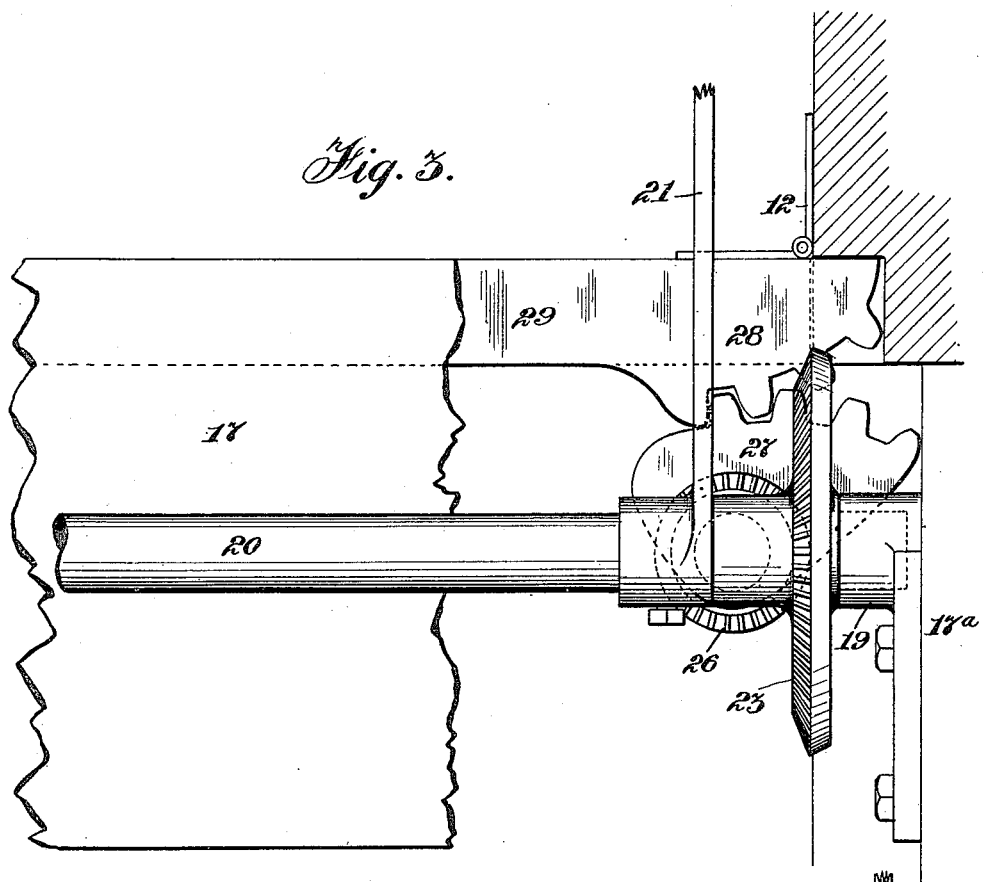
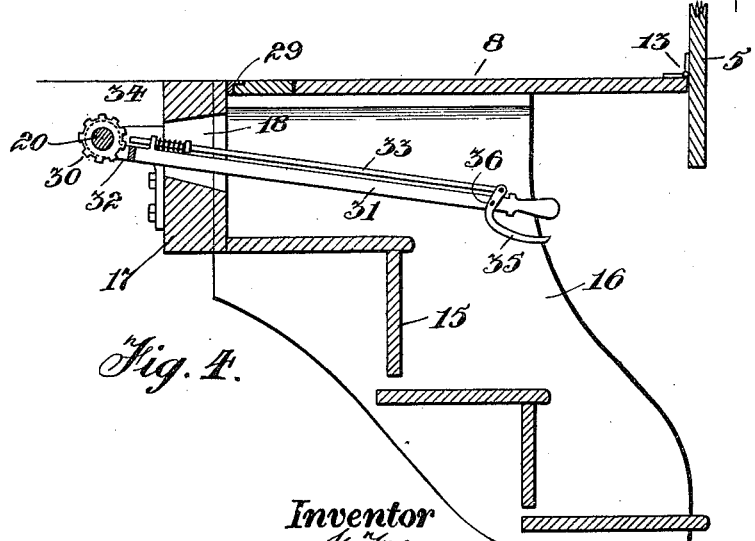

UNITED STATES PATENT OFFICE.

JOSEPH FILION, OF MONTREAL, QUEBEC, CANADA.

CAR-VESTIBULE TRAP.

993,445.  Specification of Letters Patent.  Patented May 30, 1911.

Application filed October 3, 1910. Serial No. 585,104.

*To all whom it may concern:*

Be it known that I, JOSEPH FILION, a subject of the King of Great Britain, and resident of 1122ᴬ Wellington street, in the city and district of Montreal, in the Province of Quebec, in the Dominion of Canada, have invented certain new and useful Improvements in Car-Vestibule Traps, of which the following is a specification.

The invention relates to improvements in car vestibule traps, as described in the present specification and illustrated in the accompanying drawings that form part of the same.

The invention consists essentially in the novel means employed for raising a hinged trap split diagonally and connected with the vestibule door.

The objects of the invention are to devise a form of vestibule trap which may be operated with great facility by a hand lever and thus avoid the inconvenience arising from sticking of the trap during inclement weather conditions, to enable the trap to be raised and a door opened from the outside without any difficulty, and generally to provide an efficient means of raising the trap and opening the door, coincidently, of simple, cheap and durable construction.

Figure 1:
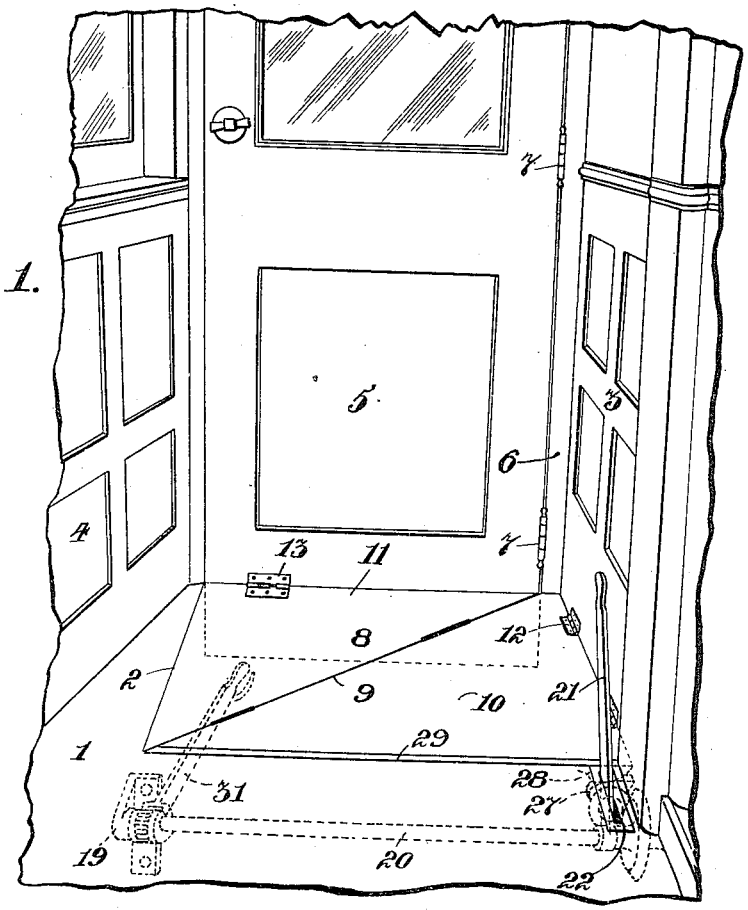
Figure 2:
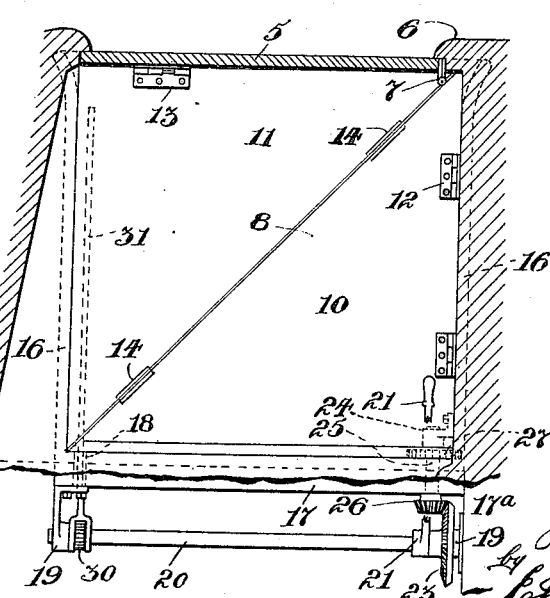

In the drawings, Figure 1 is a perspective view of a portion of a car platform and vestibule showing the trap in its closed position and the lower part of a door. Fig. 2 is a plan view of the upper side of the trap with a part of the frame broken away to show the operating mechanism. Fig. 3 is an enlarged side elevation of the elevating gears. Fig. 4 is a detail, showing the connection of the outside operating lever to the main operating shaft.

Like numerals of reference indicate corresponding parts in each figure.

Referring to the drawings, 1 is the car platform having the trap hole 2.

3 is the end wall of the car.

4 is the end wall of the vestibule.

5 is the vestibule door secured to the outwardly jutting portion 6 of the car wall 3 by the hinges 7 and arranged to open inwardly.

8 is a square trap filling in the trap hole 2 and split diagonally at 9 forming the sections 10 and 11.

12 are hinges securing the section 10 to the car wall 3.

13 is a hinge connecting the section 11 to the door 5.

14 are hinges securing the sections 10 and 11 together at the diagonal split 9, all of said hinges on the trap being arranged to permit said sections of the trap to fold upwardly so that on the breaking of the trap from the under side of said diagonal split, the door 6 will open inwardly being drawn in by the section 11, to which said door is connected.

15 are the car steps having the sides 16, at their upper ends secured to the beams 17, 17ᵃ, the latter forming part of the car frame and having the opening 18 therethrough.

19 are bearings rigidly supported from the beam 17 under the platform 1 and adjacent to the trap hole 2 at the inner side thereof.

20 is a shaft journaled in the bearings 19.

21 is a lever fixedly secured to the shaft 20, preferably at the outer end thereof, extending upwardly through the slot 22 and the platform 1 adjacent to said trap hole 2 and forming the means of manually operating said shaft.

23 is a gear wheel of the bevel or miter type, fixedly mounted on the shaft 20 adjacent to the lever 21.

24 are bearings fixedly secured to the car frame under the section 10 and at right angles to the bearings 19.

25 is a shaft journaled in the bearings 24 and in the frame of the car, terminating adjacent to the gear wheel 23.

26 is a pinion mounted at the end of the shaft 25 and co-acting with the gear wheel 23, consequently on pulling the lever 21, the shaft 20 will rotate, thereby operating the gear wheel 23 and the pinion 26.

27 is a cam gear fixedly mounted on the shaft 25 immediately under the inner edge of the section 10.

28 is a cam gear coacting with the cam gear 27 and rigidly secured to the inner edge of the section 10 and preferably forming part of the plate strip 29 extending along the inner edge face of said section 10.

It will thus be seen that on operating the said lever, gear and pinion, the cam gear 27 will perform a rotary motion and the said cam gear 29 coacting with the cam gear 27 will turn the said section 10 on its hinges 12, with the result that the said section 10 will be raised, consequently the section 11 must follow as it is connected by the hinges 14 to the said section 10 and further the door being connected by the hinge 13 to the section 11 will open inwardly, thus the sections 10 and 11 will fold against the wall and the door up against them.

30 is a toothed wheel fixedly mounted on the shaft 20 at the outer end.

31 is a lever having the forked end 32, the prongs of said forked end being pierced and loosely mounted on the shaft 20, embracing the ratchet wheel 30.

33 is a rod forming the pawl, slidably secured on the upper side of the lever 31 and spring-held by the spring 34 from engagement with the toothed wheel 30.

35 is a suitably curved lever pivotally secured to the outer end of the rod 33 and secured to the lever 31 by a fixed pivot 36 and arranged so that on pressing the said lever 35 inwardly to the handle of the lever 31, the said rod 33 will be brought into engagement with the toothed wheel 30, thereby forming a means of rotating the shaft 20 independently of the lever 21 for the purpose of raising the sections 10 and 11 and opening the door 5.

The lever 31 extends outwardly through the opening 18 beneath the trap 8, consequently the door 5 may be opened from the outside.

In the operation of this invention, the usual way it is done is by pulling the lever 21, which as before explained rotates the shaft 20 and as the cam gears 27 and 28 are so shaped as to effect the upward movement of the section 10, the trap is raised and the door opened.

It must be pointed out that it is a great convenience having the trap operable from outside by means of the lever 31 thus the said trap can be raised by lifting said lever 31 with as much ease as by pulling on the lever 21, therefore, the danger of closed doors in vestibule trains is entirely overcome, for no one can be positively shut out where the opening means is so simple and at hand.

What I claim as my invention is:

1. In a car vestibule trap, the combination with the car vestibule having a trap hole in the platform thereof, of a trap filling said hole and split diagonally, one section of said trap being hinged to the end wall of the car and to the other section at the diagonal split, a gear wheel and pinion mechanism suitably supported under said platform and operatively connected with one section of said trap, and an operating lever.

2. In a car vestibule trap, the combination with the car vestibule having a trap hole in the platform thereof, of a trap diagonally split, one section of said trap being hinged to the car wall and to the other section at the diagonal split, a vestibule door hinged to the other section, a shaft suitably supported and journaled under said platform, a gear wheel mounted on said shaft, a supplemental shaft suitably supported and journaled adjacent to the aforesaid shaft, a pinion fixedly mounted on said supplemental shaft coacting with said gear wheel, a cam mounted on said supplemental shaft, and a cam secured to one of said trap sections and coacting with the aforesaid cam.

3. In a car vestibule trap, the combination with the car vestibule having a trap hole in the platform thereof, of a square trap filling said hole and split diagonally, one of said sections being hinged to the car wall and to the other section, a door hinged to said other section, bearings secured to the car frame beneath the platform, a shaft journaled in said bearings, a gear wheel mounted at one end of said shaft, a lever secured to one end of said shaft and extending upwardly through the platform, bearings secured to the car frame at right angles to the aforesaid bearings, a supplemental shaft journaled in the latter bearings, a pinion coacting with the aforesaid gear, a cam mounted on said supplemental shaft, and a cam rigidly secured to the inner edge face of one of said sections coacting with the aforesaid cam.

4. In a car vestibule trap, the combination with the car vestibule having a trap hole in the platform thereof, of a trap of square formation and split diagonally, one section of said trap being hinged to the end car wall and to the other section at the diagonal split, a vestibule door hinged to said other section, bearings secured to the car frame under the platform thereof adjacent to said trap opening, a shaft journaled in said bearings, a lever projecting upwardly through the platform and fixedly secured to said shaft, a gear wheel fixedly mounted on said shaft, bearings secured to the car frame at right angles to the aforesaid shaft, a supplemental shaft journaled in said bearings, a pinion mounted on said supplemental shaft and coacting with the aforesaid gear wheel, a cam gear mounted on said supplemental shaft, and a cam gear rigidly secured to the inner edge face of one section of said trap and coacting with the aforesaid cam gear.

5. In a device of the class described, in combination, a car vestibule having a trap hole in the platform thereof and an inwardly swinging door, a square trap filling said trap hole and diagonally split, one section of said trap being hinged to the car wall side of the vestibule and the other section being hinged to the door, said two sections being hinged together at the diagonal split, a shaft suitably supported and journaled beneath the platform of said vestibule, a supplemental shaft journaled at right angles to the aforesaid shaft, a gear mechanism operatively connecting said shafts and one section of said trap, a toothed wheel mounted on said main shaft, and a lever supporting a spring pawl engaging said toothed wheel for operating said shaft and gear mechanism and extending outwardly under said trap.

6. In a device of the class described, in combination, a car vestibule having a trap hole in the platform thereof and an inwardly opening door, a trap split diagonally filling said opening, one section of said trap being hinged to the car wall side of the vestibule and the other section being hinged to the door, said two sections being hinged together at the diagonal split, a main shaft suitably journaled and supported beneath said platform, a supplemental shaft suitably supported and journaled adjacent to the aforesaid shaft, a gear mechanism operatively connecting said shaft and one section of said trap, a toothed wheel mounted on said main shaft, and a lever having a forked end loosely mounted on said shaft and embracing said toothed wheel and carrying a pawl spring-held from engagement with said ratchet wheel and extending outwardly through the car frame underneath said trap.

7. In a device of the class described, in combination, a car vestibule having a trap hole in the platform thereof and an inwardly opening door, a trap diagonally split filling said opening, one section of said trap being hinged to the end car wall and the other to the door, a plurality of shafts suitably supported and journaled beneath said platform, coacting gear wheels mounted on said shafts, and operating means connecting one of said shafts with one section of said trap.

Signed at the city and district of Montreal, in the Province of Quebec, in the Dominion of Canada, this 24th. day of September, 1910.

JOSEPH FILION.

In the presence of—
G. H. TRESIDDER,
P. SHEE.

---

Copies of this patent may be obtained for five cents each, by addressing the "Commissioner of Patents, Washington, D. C."